US010637574B2

(12) United States Patent
Guetta

(10) Patent No.: US 10,637,574 B2
(45) Date of Patent: Apr. 28, 2020

(54) FREE SPACE OPTICAL COMMUNICATION SYSTEM

(71) Applicant: SHILAT OPTRONICS LTD, Rehovot (IL)

(72) Inventor: Avishay Guetta, Rehovot (IL)

(73) Assignee: SHILAT OPTRONICS LTD., Rehovet (IL)

( * ) Notice: Subject to any disclaimer, the term of this patent is extended or adjusted under 35 U.S.C. 154(b) by 0 days.

(21) Appl. No.: 14/773,391

(22) PCT Filed: Mar. 5, 2014

(86) PCT No.: PCT/IL2014/050223
§ 371 (c)(1),
(2) Date: Sep. 8, 2015

(87) PCT Pub. No.: WO2014/136110
PCT Pub. Date: Sep. 12, 2014

(65) Prior Publication Data
US 2016/0020855 A1    Jan. 21, 2016

Related U.S. Application Data

(60) Provisional application No. 61/851,268, filed on Mar. 5, 2013.

(51) Int. Cl.
*H04B 10/00* (2013.01)
*H04B 10/116* (2013.01)
(52) U.S. Cl.
CPC .................. *H04B 10/116* (2013.01)
(58) Field of Classification Search
USPC ................. 398/131, 129; 250/203.1, 208.2
See application file for complete search history.

(56) References Cited

U.S. PATENT DOCUMENTS 5,142,400 A * 8/1992 Solinsky ............ H04B 10/1127
356/139.05
5,229,594 A * 7/1993 Vilaire .................... G01S 3/784
250/203.3

(Continued)

FOREIGN PATENT DOCUMENTS

WO    WO 2011/073980 A1    6/2011

OTHER PUBLICATIONS

PCT International Search Report and Written Opinion of the ISA, dated Jul. 23, 2014 in PCT/IL2014/050223.

*Primary Examiner* — David C Payne
*Assistant Examiner* — Pranesh K Barua
(74) *Attorney, Agent, or Firm* — Alphapatent Associates, Ltd; Daniel J. Swirsky

(57) ABSTRACT

A method and system for optical communication between a transmitter and receiver, using a video camera to image the location of the remote transmitter. The comparatively slow frame rate of conventional detector arrays, which would limit communication rate, is overcome by reading only pixels in a region of interest around the transmission source image, and these pixels can then be read out and the communication information on them retrieved, at a frame rate much faster than that of the conventional full frame read-out. Custom wiring of the array can be used to enable implementation of this increased frame rate. Other methods of increasing communication speed using a video camera array detector include spreading the optical signal spatially along a row of pixels, and reading those pixels simultaneously in one frame, or wavelength multiplexing the optical information, and dispersing the different wavelengths onto successive pixels of the array.

16 Claims, 8 Drawing Sheets

(56) References Cited

U.S. PATENT DOCUMENTS

| | | | | |
|---|---|---|---|---|
| 5,659,413 A * | 8/1997 | Carlson | H04B 10/118 | 398/119 |
| 6,016,212 A * | 1/2000 | Durant | H04B 10/11 | 385/43 |
| 6,462,846 B1 * | 10/2002 | DeLong | G02B 17/061 | 398/135 |
| 6,731,415 B1 * | 5/2004 | Plett | H04B 10/1123 | 359/1 |
| 6,839,519 B1 * | 1/2005 | Kleiner | H04B 10/118 | 356/141.2 |
| 6,973,207 B1 * | 12/2005 | Akopyan | G06K 9/6206 | 382/142 |
| 7,711,441 B2 * | 5/2010 | Tillotson | B60L 8/00 | 700/59 |
| 8,581,771 B2 * | 11/2013 | Bradley | G06F 21/6209 | 244/3.1 |
| 2004/0258415 A1 * | 12/2004 | Boone | H04B 10/1125 | 398/125 |
| 2005/0024510 A1 * | 2/2005 | Lapstun | H04N 5/3559 | 348/294 |
| 2005/0269523 A1 * | 12/2005 | MacAulay | G01N 21/274 | 250/458.1 |
| 2007/0007436 A1 * | 1/2007 | Maksymowicz | G01J 1/4228 | 250/208.2 |
| 2008/0118247 A1 * | 5/2008 | Drago | H04B 10/118 | 398/122 |
| 2009/0010644 A1 * | 1/2009 | Varshneya | G01S 7/481 | 398/33 |
| 2009/0283598 A1 * | 11/2009 | Sherman | G06K 9/3216 | 235/404 |
| 2009/0290057 A1 * | 11/2009 | Ohtsuki | H01L 27/14603 | 348/303 |
| 2010/0079646 A1 * | 4/2010 | Yin | H01L 27/14609 | 348/308 |
| 2010/0302282 A1 * | 12/2010 | Dobbie | F41G 1/35 | 345/666 |
| 2011/0205411 A1 * | 8/2011 | Voronov | H04N 5/341 | 348/294 |
| 2012/0039617 A1 * | 2/2012 | Duligall | H04B 10/1141 | 398/152 |
| 2012/0104233 A1 * | 5/2012 | Mori | H03M 1/1019 | 250/208.1 |
| 2013/0087684 A1 * | 4/2013 | Guetta | F41G 3/145 | 250/208.1 |
| 2013/0156432 A1 * | 6/2013 | Arnold | H04B 7/185 | 398/67 |
| 2013/0235235 A1 * | 9/2013 | Takahashi | H04N 5/2173 | 348/231.99 |
| 2013/0251374 A1 * | 9/2013 | Chen | H04B 10/118 | 398/118 |
| 2013/0266325 A1 * | 10/2013 | Giustiniano | H04B 10/116 | 398/130 |
| 2013/0279813 A1 * | 10/2013 | Pau | G06T 7/33 | 382/201 |
| 2014/0071321 A1 * | 3/2014 | Seyama | H04N 5/2353 | 348/308 |
| 2014/0241731 A1 * | 8/2014 | Peach | H04B 10/1127 | 398/128 |
| 2015/0180581 A1 * | 6/2015 | Steiner | H04B 10/5561 | 398/188 |
| 2016/0072580 A1 * | 3/2016 | Wabnig | H04B 10/1143 | 398/131 |

* cited by examiner

FREE SPACE OPTICAL COMMUNICATION SYSTEM

CROSS-REFERENCE TO RELATED APPLICATIONS

This application is a U.S. National Phase Application under 35 U.S.C. 371 of International Application No. PCT/IL2014/050223, which has an international filing date of Mar. 5, 2014, and which claims the benefit of priority from U.S. Provisional Patent Application No. 61/851,268, filed Mar. 5, 2013, the disclosures of which are incorporated herein by reference in their entirety.

FIELD OF THE INVENTION

The present invention relates to the field of optical communication systems in free space from point to point, especially using a camera system.

BACKGROUND OF THE INVENTION

Currently free space optical communication is realized using a point source as a transmitter and a single detector receiver. A single detector receiver has a basic operational limitation that makes its use more difficult in the field, in that the field of view is very small, and thus mandates accurate alignment of the receiver with the transmitter. A large angular aperture, typically of at least 5°, would make use of such a system much simpler, since it would only be necessary for the person receiving the signal to know the approximate sector in which the transmitting party is situated, instead of the need to pinpoint their location more accurately. The requirement for the transmitter to accurately aim at the receiver depends upon the need to maintain covert transmission conditions.

A further requirement for the detector of such a free space optical communication receiver is that it should have the highest possible signal-to-noise ratio (SNR), which means that it should have as large an aperture as possible, and the it should have as low a noise level as possible. The latter requirement can be fulfilled by using a photomultiplier tube (PMT) detector, which is a large area detector having high sensitivity because of its internal amplification. However, the cost of a photomultiplier detector is high, and semiconductor detectors present a much more practical option. Such detectors are generally small area detectors, and include such detectors as the avalanche photodiode (APD) and the PIN photodiode. There are trade-offs between the use of these various types of detectors, as now discussed.

The main limitation of a large area, low noise detector such as a PTM, is the quantum noise caused by the background radiation. The use of a large numerical aperture leads to large amounts of collected background radiation and hence high quantum noise. Such quantum noise attenuates the SNR of the channel, and neutralizes the "low noise" advantage of a PMT.

As a numerical example, for a 50 mm. entrance aperture PMT with a 10° angular aperture and a quantum efficiency of 10%, at a bit rate of 4 MB/sec, the effective noise equivalent power (NEP) is 12.5 nW. Such a noise level is similar to the noise of a large PIN detector and is approximately 100 times greater than the noise of a low noise detector. In addition to the quantum noise, there are several additional disadvantages of the PMT, such as its high cost, the low quantum efficiency of a photocathode based detector, and the gradual degrading of the sensitivity of the detector with use.

On the other hand, a low dark noise semiconductor detector, such as an APD, will have an entrance aperture of less than 0.5 mm, and generally less than 0.2 mm, and in order to collect light for such a detector using a 30 mm diameter lens, the field of view (FOV) will be less than 0.5°. Such a small FOV for a free space optical communication application, would require precise alignment of the receiver with the transmitter, and is not therefore suited to tactical needs in the field. The main limitation to realizing a free space tactical optical communication system is the strong dependence between the sensitivity of the receiver and the need for precise alignment of the receiver towards the transmitter. Since a sensitive receiver can only be practically realized using small area detectors, but this leads to a small angular aperture, making use more problematic.

There therefore exists a need for an optical communication system incorporating a receiver which overcomes at least some of the disadvantages of prior art systems and methods, and in particular, which dispenses with the need for the accurate line of sight alignment required by such prior art systems.

The disclosures of each of the publications mentioned in this section and in other sections of the specification, are hereby incorporated by reference, each in its entirety.

SUMMARY

The present disclosure describes new exemplary systems for optical point to point communication in free space using an imaging sensor for encoded laser signal recognition. The system differs from prior art systems in that the receiver incorporates an image sensor array, in which each pixel of the sensor array can serve as a separate receiver. Since the pixel dimensions in such an imaging sensor are so small, the noise level of each pixel is also low, as desired. The typical pixel size in such an imaging array may be of the order of 5×5μ, and for such sized pixels, the typical detection noise ranges from 5 to 30 e$^-$ per reading scan. Consequently, on the one hand, use of such a sensitive detector will result in a highly sensitive receiving channel, typically 100 times more sensitive than other systems having a large FOV, while on the other hand, since the detector consists of a large number of pixels, the effective angular aperture is relatively wide, thereby providing a large aperture and high receiver sensitivity.

However, there is a problem with such use of a large area, high pixel count, imaging array, since such sensors are not intended for use at the high bit-rates typical of optical communication links. High pixel rates are indeed achievable, ranging from 40 to 1000 Mpix/sec. But the limited frame rate of such an imaging array, generally in the range of some tens of frames per second, (though special design systems may achieve a thousand frames per second), presents a major disadvantage. Since the sensor array needs to image a full frame at a time, the frame rate may be about six orders of magnitude lower than the pixel rate.

In order to overcome this limitation, the optical communication systems of the present disclosure make use of the fact that since the transmitted optical signal is imaged by a single pixel, or at most by a few pixels, an optical communication signal can be read out by a single pixel signal, or by signals from a few pixels, out of each frame. Therefore, in order to increase the optical communication rate, a limited region of interest (ROI) can be defined in each frame, which includes only a small number of pixels which can consequently be read out at high speed. This ROI can be defined by scanning the field of view (FOV), locating any imaged transmission sources in the field, and selecting the desired source with which communication is to be conducted. Once the system has locked onto the desired transmission source, it will sample pixels only within the selected ROI of the detector. The system signal processing program can be adapted to follow movement of the source in the ROI, such that as the transmitter moves, the ROI of the array will follow its movements. If the source image is lost, then a new scan can be performed to find it again and to redefine the ROI on the image array.

Since a conventional CCD or CMOS based imaging array operates by reading out the pixel data of the entire array column-by-column, such a conventionally constructed sensor array will be unable to provide significant improvement in the frame rate, since in order to access all of the pixels in the ROI, it will be necessary to read all of the pixels in the columns running through the ROI, and therefore, no increase in the frame rate can be achieved. In order to achieve a higher frame rate in the optical communication systems of this disclosure, the imaging arrays may be provided with an amended wiring configuration, in which the array is divided up into sub-regions of similar size to that of the ROI used, and all of the pixels of each of those sub-regions having corresponding spatial locations in those sub-regions are wired serially to form the equivalent of the "column" signal wires in a conventional imaging array. The pixels in each of those "column" signal wires are read sequentially, while different "column" signal wires can be read simultaneously. As a result, all of the pixels in any ROI can be accessed simultaneously, since any pixel in that ROI has all of its immediate neighbors connected to a different "column" signal wire, all of which can be read simultaneously. The position of the ROI in the entire pixel matrix, as determined by the image detected by the array itself, can be used by the array gating process algorithm to define the sub-region of the matrix whose pixels are to be read out in parallel, the signals from those pixels defining the ROI signals. By this means, each frame sweep accesses signals detected by the pixels in the ROI only, and each frame sweep can therefore be performed more quickly.

As an alternative to this structure, it is possible to use a spot scanning process across multiple pixels of an elongated strip ROI of the array, in order to increase the reading speed of the communication information. Since a high frame rate is the most significant factor in achieving a high bit rate for the optical communication system, any solution which enables the transmission of more than one bit per frame could significantly simplify and improve the system. If the detected spot is temporally and spatially spread across the detector array, such that the spot impinges on successive different pixels at different times, and if this process is performed during the duration of a single frame, a significant increase in information transfer rate can be achieved. Reading a strip of spots within a frame, each of the spots carrying successive bits of the optical information, is faster than reading that information from successive frames, by a factor related to the number of spots that are spread onto the single frame.

As another alternative, it is possible to use a spread wavelength technique, in order to increase the reading speed of the communication information. In this scheme, the field of view is illuminated by a series of lasers, each having a slightly different wavelength, and arranged such that all are projected into the field into which it is desired to maintain optical communication. The field of view is imaged by the input lens of the camera, and is spatially spread along a row of pixels by means of a wavelength spreading mechanism, such as a diffraction grating. All of these pixels in the row can then be read simultaneously in a single frame, and since each different wavelength source can be modulated to with its own information stream, the bit rate can be increased in accordance with the number of sources used.

There is thus provided in accordance with an exemplary implementation of the devices described in this disclosure, a method of optical communication between a transmitter source and a receiver, the method comprising:

(i) imaging a region including the transmission source on a two-dimensional pixelated detector array, successive frames of the array being readable at a first frame reading rate, (ii) detecting on the array the position of the imaged transmission source, (iii) selecting a region of interest on the array, including the position of the imaged transmission source, the region of interest having a substantially smaller number of pixels than the pixelated detector array, and (iv) reading signals only from pixels in the region of interest, at a frame rate faster than the first frame rate.

Such a method may further comprise the provision of array gate switching, programmed such that signals from pixels of the array outside of the selected region of interest are not read. In either of the above two cases, the region of interest may be moved to track motion of the position of the imaged transmission source on the array. Furthermore, the signal outputs of each of the pixels within sub-regions of the pixelated detector array having a predefined area, are wired in separate read lines, such that each of the pixels of a sub-region can be read simultaneously on separate read lines. In the latter case, pixels from corresponding positions in different sub-regions of the array should all be wired to the same read lines, such that all of the pixels of a region of interest can be read simultaneously, independently of where that region of interest falls on the array.

In any of the above mentioned methods involving sub-regions, every pixel within any sub-region may have all of its immediate neighbors connected to a different sampling line. Also, the regions of interest may be selected to be no larger than the sub-regions of predefined area, and the regions of interest may be selected such that all of their pixels fall within the size and shape of the sub-regions of predefined area.

Other implementations of these methods further comprise the step of determining the analog level of the signals read from pixels in the region of interest, such that information in grey level coded optical transmissions can be retrieved.

Still other example implementations involve a system for optical communication comprising:

(i) a receiver adapted to receive optical data from a transmitter source, the receiver comprising a two-dimensional pixelated detector array, such that an image of the transmitter source can be obtained on the array, and (ii) a controller adapted to select a region of interest including pixels defining the position of the imaged transmission source on the array, the region of interest having a substantially smaller number of pixels than the pixelated detector array, and to read signals only from pixels in the region of interest, wherein the signals only from pixels in the region of interest can be read at a frame rate faster than the frame rate of a complete frame of the array.

Such a system may further comprise an array gate switch, programmed such that signals from pixels of the array outside of the selected region of interest are not read. In either of the above two cases, the controller may be adapted to track motion of the position of the imaged transmission source on the array, and to shift the region of interest to include pixels defining the new position of the imaged transmission source.

Furthermore, the pixelated detector array may be wired such that signal outputs of each of the pixels within sub-regions having a predefined area of the pixelated detector array, are directed to separate read lines, such that each of the pixels of a sub-region can be read simultaneously on separate read lines. In the latter case, pixels from corresponding positions in different sub-regions of the array should all be wired to the same read lines, such that all of the pixels of a region of interest can be read simultaneously, independently of where that region of interest falls on the array. Additionally, every pixel within any sub-region should have all of its immediate neighbors connected to a different sampling line, and the regions of interest should be selected to be no larger than the sub-regions of predefined area. Finally, the regions of interest may be selected such that all of their pixels fall within the size and shape of the sub-regions having a predefined area.

Any of the above described exemplary systems may further comprising a separate imaging array adapted to detect the position of the transmitter source from an encoded signal emitted by the transmitter source.

Yet other implementations perform a method of free space optical communication, comprising:
(i) modulating an optical beam with information impressed on temporally successive segments of the beam,
(ii) transmitting the beam through free space to a receiver having a beam scanning device, such that the temporally successive segments of the signal are deflected at different angles,
(iii) impinging the deflected temporally successive segments of the signal on successive pixels of a strip of a detector array, and
(iv) reading all of the successive pixels of the strip of the detector array in a single frame time, such that optical information on the successive segments of the signal are read simultaneously.

In such a method, the temporal difference between the first and the last of the temporally successive segments of the optical signal, should be no longer than the frame time of the detector array.

Still other example implementations involve a method of free space optical communication comprising:
(i) impressing optical information onto a plurality of sources of different wavelengths,
(ii) transmitting optical signals of different wavelengths from each of the plurality of sources through space to a receiver, the receiver being sufficiently remote from the plurality of sources that light from the signals of different wavelength is combined,
(iii) dispersing the received light such that optical signals from the plurality of sources of different wavelengths are spatially separated,
(iv) impinging the spatially separated optical signals on successive pixels of a strip of a detector array, and
(v) reading all of the successive pixels of the strip of the detector array in a single frame time, such that the optical information impressed on the sources of different wavelengths are read simultaneously in the single frame time.

In such a method, the dispersing may be achieved by use of a blazed reflection grating.

BRIEF DESCRIPTION OF THE DRAWINGS

The present invention will be understood and appreciated more fully from the following detailed description, taken in conjunction with the drawings in which:

FIG. 1 illustrates schematically how the receiver unit of a communication system of the present application detects a number of transmissions which it may wish to make contact with;

FIG. 5A illustrates the pixel structure of a conventional readout CMOS array of the type shown in FIG. 4, while

FIG. 8 shows an array of diode lasers, each having a different emitted wavelength, FIG. 9 shows how the received light from that array of diode lasers is dispersed over a length of the imaging array, and FIG. 10 shows schematically how the spectrally dispersed spot scanning system of FIGS. 8 and 9 can be implemented in practice in the optical communication systems of this disclosure;

DETAILED DESCRIPTION

Figure 1:
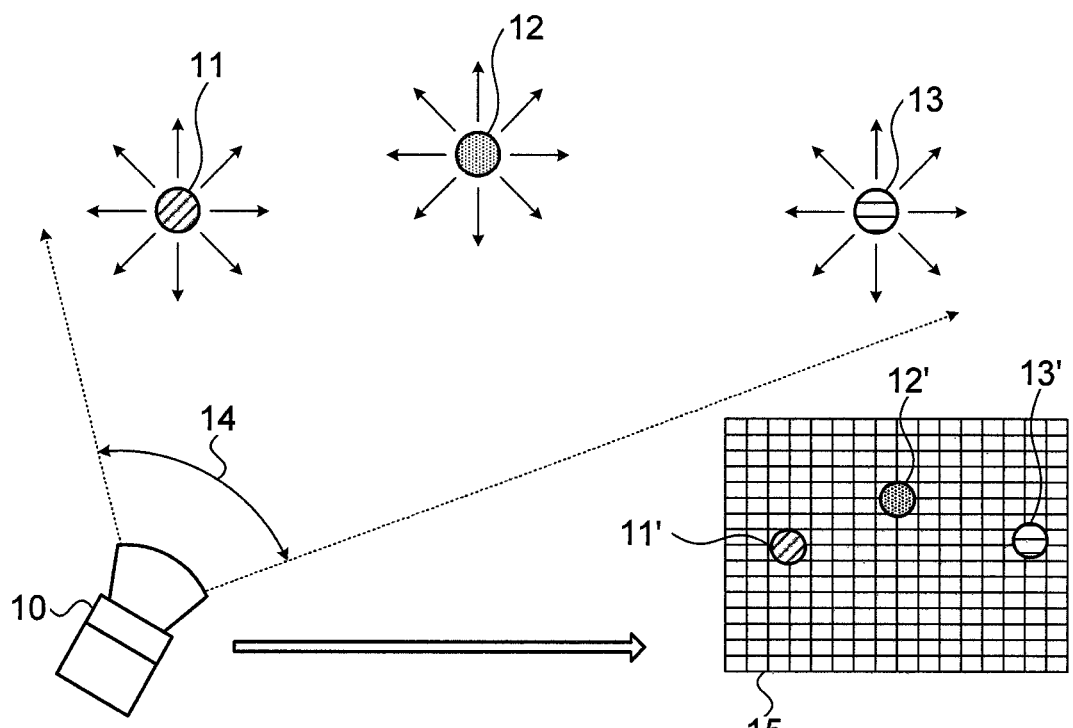

Reference is now made to FIG. 1, which illustrates schematically a scenario illustrating the way in which the receiver unit 10 of a communication system of the present application, surveils the scene in front of it over a large field of view 14, looking for transmitters whose operators may be attempting to communicate with the receiver. The transmitters will generally be light sources based on a single emitter laser diode or a laser diode array, modulated, using the serial communication signal which it is desired to transmit to the receiver. In the scenario of FIG. 1, several such transmitters 11, 12, 13, have been located in such a scan, and are imaged on the image sensor array 15 of the video camera in the receiver 10 as signal spots 11', 12' 13', each of which could cover one or more pixels of the sensor array. Detection and identification of the transmitter sources can be performed by means of the coding and detection methods shown in International Patent Application published as WO 2011/073980 for "Laser Daylight Designation and Pointing", having a common applicant with the present application. That system enables a comparatively weak laser marker signal generated by a transmitter to be detected by the receiver even though the background illumination arising from the daylight, or from extraneous light sources, may be substantially stronger than the laser marker signal. Alternatively, any other seeking and detection system may equally well be used. The sensor array 15 may provide a real-time display to the receiver operator, either by means of a miniature display in the receiver, or by means of connection to a computer for communication and data display, so that the operator can choose which transmission it is desired to receive and with which to make contact. Since each of the transmission sources 11, 12, 13, may generally originate from different operators, the receiver may make contact by any means to the transmission sources, such as by telephone or by use of the system itself, to determine which transmission it is desired to make contact with, and to select that transmission spot detected on the display of the receiver.

The communications information may be read from only a single pixel or a few pixels in each frame, which could include millions of pixels, and the communication bit rate desired from such a system could be several Mb/sec. Consequently, if a conventional imaging sensor system were to be used, the frame rate required to read the communications information from complete frames, even though the information is only on a few pixels of those frames, would be many orders of magnitude beyond that available from camera systems currently available. These operate at frame rates of from some tens of frames per second to thousands of frames per second. However, since the optical signal to be received falls on a single pixel or a few pixels of the detector array, the present system overcomes this frame rate limitation by defining a region of interest (ROI) in the sensor array, the region of interest including a small number of pixels including the detected transmission spot and its immediately surrounding pixels. If a method is devised for reading only the pixels in the ROI, which could be tens of pixels rather than millions, then currently available frame rates would be able to handle the information rates required by the communications system. The way in which this is electronically achieved is described hereinbelow.

Figure 2A:
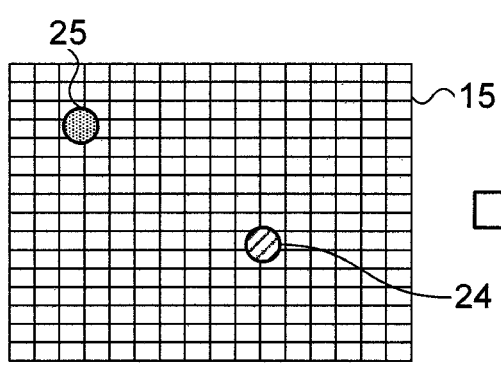
FIGS. 2A-2D illustrate how a region of interest is selected in the detector array of the receiver unit, and is used to maintain communications contact between the receiver and transmitter, even though they may be mutually moving.
Figure 2B:
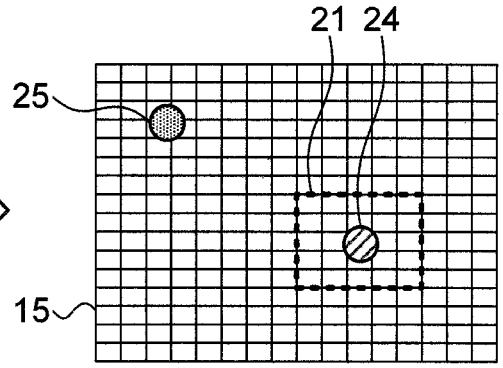
Figure 2D:
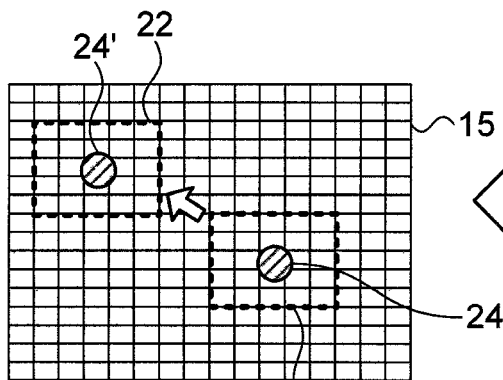
Figure 2C:
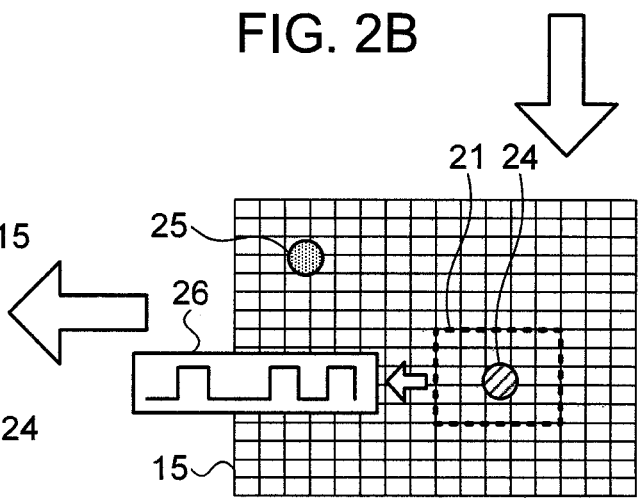

Reference is now made to FIGS. 2A to 2D, which illustrate how the ROI is selected, and used to maintain communications contact between the receiver and transmitter even though they may be mutually moving. In FIG. 2A, there is shown on the detector array 15, two transmission spots 24, 25, which have been detected in the field of view scan. In FIG. 2B, the operator has decided that the transmission source located as image spot 24 is that with which the operator wishes to communicate, and defines a region of interest 21 containing a predetermined small number of pixels around the spot 24. Once the system is locked onto this desired transmission source 24, the gated array of the detector (usually configured as an FPGA) is programmed to sample pixels only in the ROI 21 of the detector, such that each frame has only to handle information from a small number of pixels, and can readily accommodate the high information bit-rate optical transmission 26 even at a moderately slow frame rate. The manner in which this is achieved is further explained in connection with FIGS. 5A and 5B hereinbelow. The communication link in operation is shown schematically in FIG. 2C. Reference is now made to FIG. 2D, which illustrates how the transmission image spot 24 may move to a different position 24', if for instance the transmission source or the receiver move relative to each other. A signal processing algorithm can be used for determining when the transmission source spot 24 moves away from the center of the ROI 21, and can move the ROI with movement of the spot. If the noise level of the imaged spot is insufficient to enable accurate following of the movement of the spot within the ROI, and the spot is lost, then a new field of view scan can be performed in order to find the new position of the imaged spot 24. In FIG. 2D, for instance, the imaged spot 24 has moved in the sensor array and the system software has moved the ROI to its new position 22 around the new position 24' of the imaged spot. By this means the ROI follows the transmitter as it moves.

Figure 3:
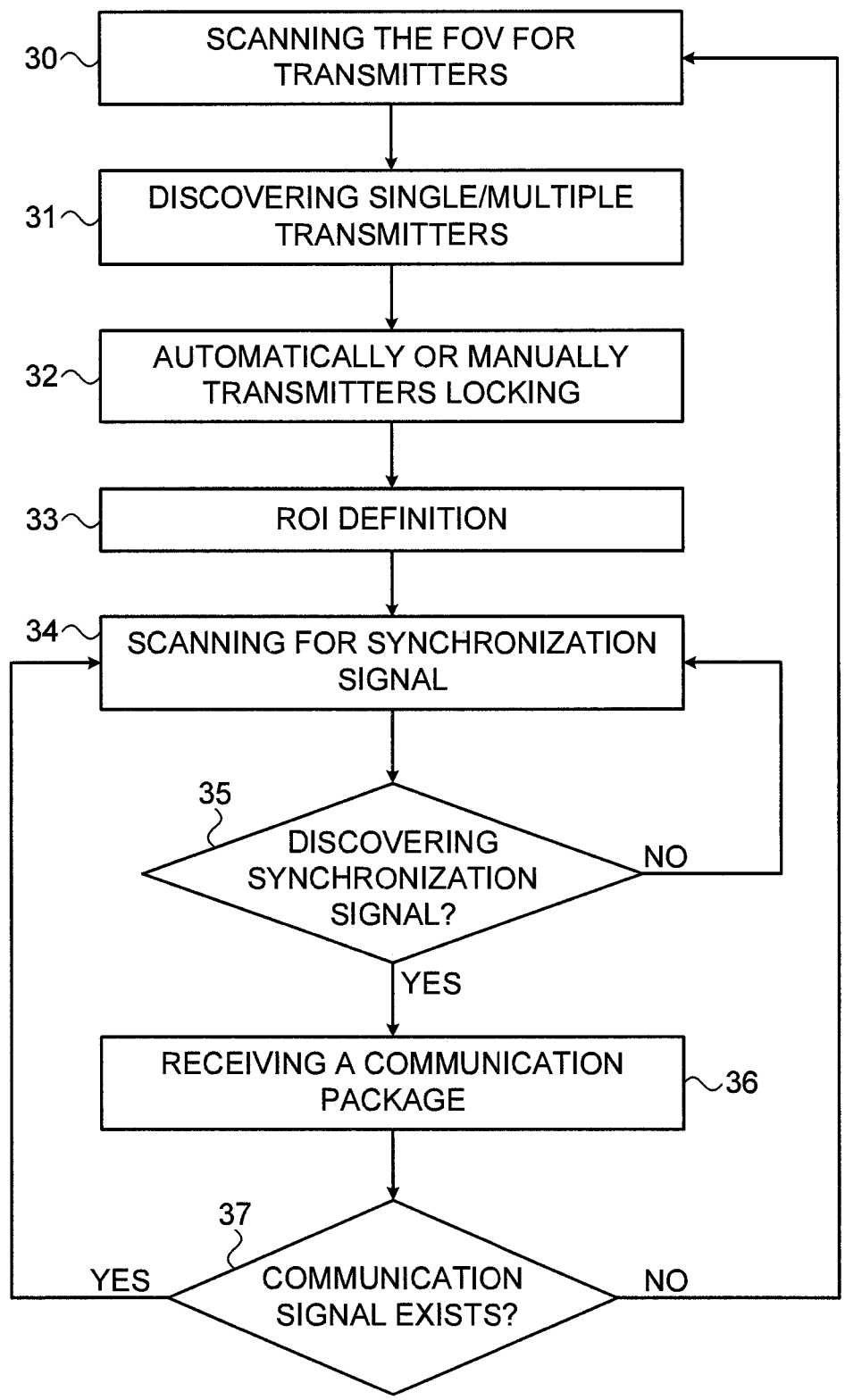
FIG. 3 is a flow chart showing how the complete optical communication procedure is performed using the methods and systems of the present disclosure.

Reference is now made to FIG. 3, which is a flow chart showing how the complete optical communication procedure is performed using the methods and systems of the present disclosure. Starting at step 30, the receiver scans the field of view looking for transmission signals, preferably by using a seeker camera based on the technology described in the above mentioned WO 2011/073980 PCT application. In step 31, there is shown that the seeker camera system has found transmitter signals, and in step 32, the receiver has locked onto that signal from the transmitter with which it is desired to establish optical communications, as shown previously in FIG. 2B. In step 33, the region of interest is defined around the selected transmitter signal spot, according to predetermined criteria for the size of the region of interest. Steps 34 to 37 then relate to the actual optical communication process, and could be amended to suit the specific optical communication protocol used. In the exemplary process now described in these steps, in steps 34 and 35, the signal received is scanned in order to detect any synchronization signal or coding indicating that the transmission detected is indeed from the source with which it is intended to communicate. If no synchronization signal is detected in step 35, the system continues to scan the ROI until such a synchronization signal is found. Once synchronization has been verified, in step 36, the receiver can commence to receive serial communications packages. After each package, in step 37, the system checks that the communication signal still exists within the predefined region of interest, and if so, searches for a synchronization signal to enable receipt of a further communication package. If no communication signal can be found in step 37, that is a sign that contact has been lost with the transmitter, such as could occur if the transmitter or receiver have substantially moved, and the procedure returns to step 30, in order to scan the field of view again to find signals from transmitters in the field, in order to rediscover the position to which the ROI has to be moved to continue communication.

Figure 4:
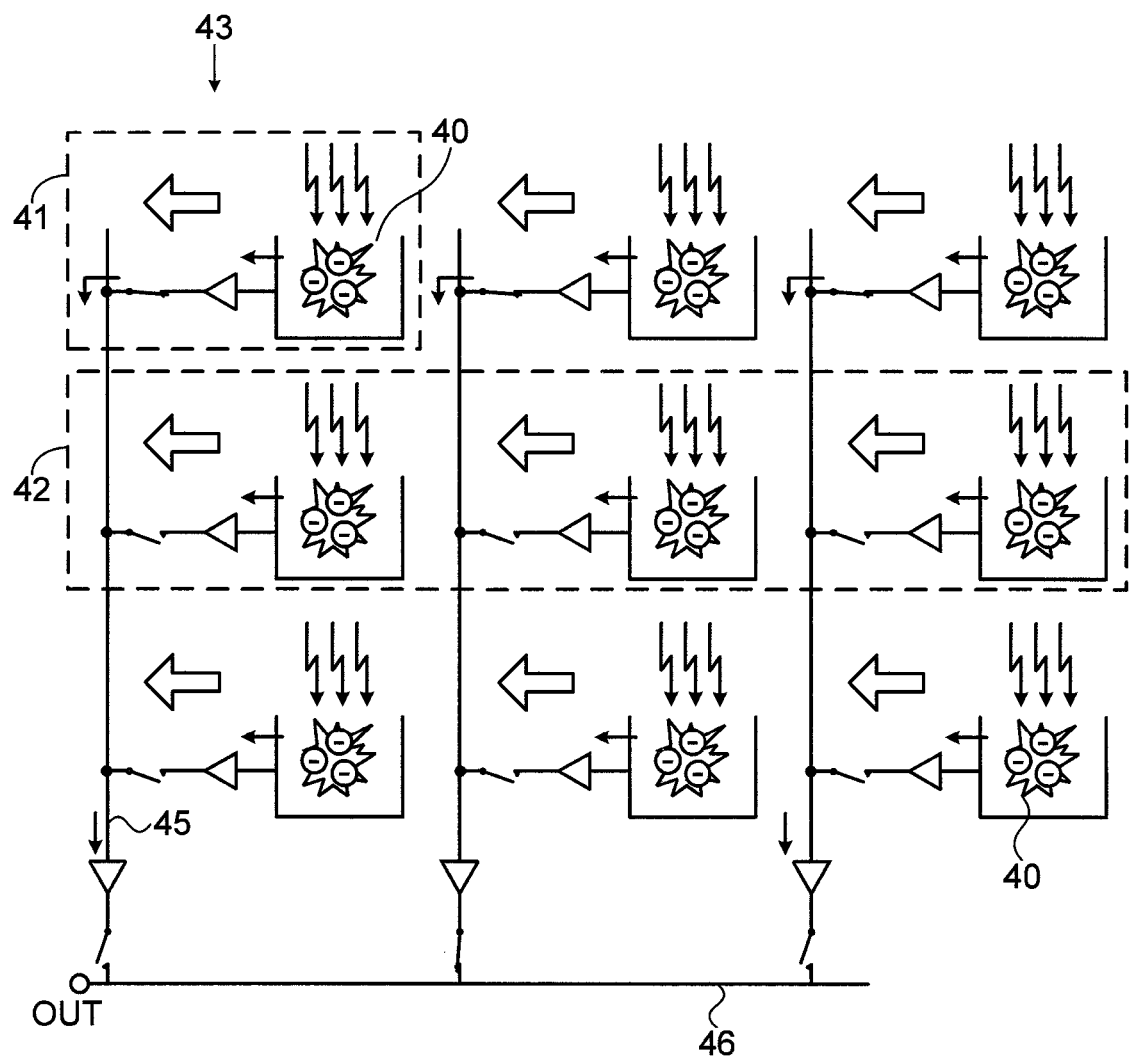
FIG. 4 illustrates the structure commonly used in a CMOS detector array, with the signal readout lines shown.
Figure 5A:
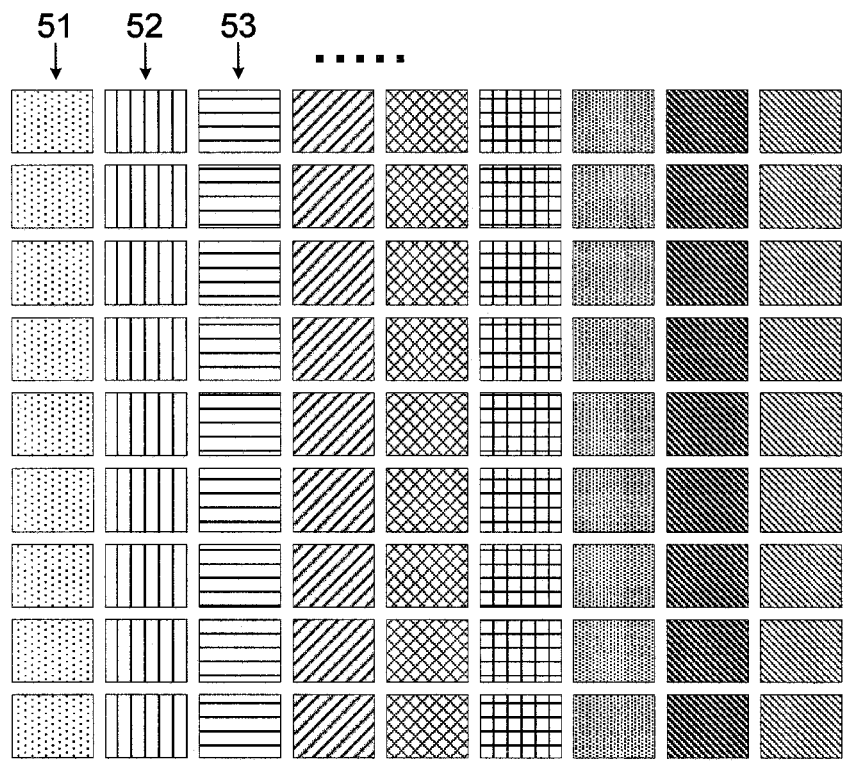
Figure 5B:
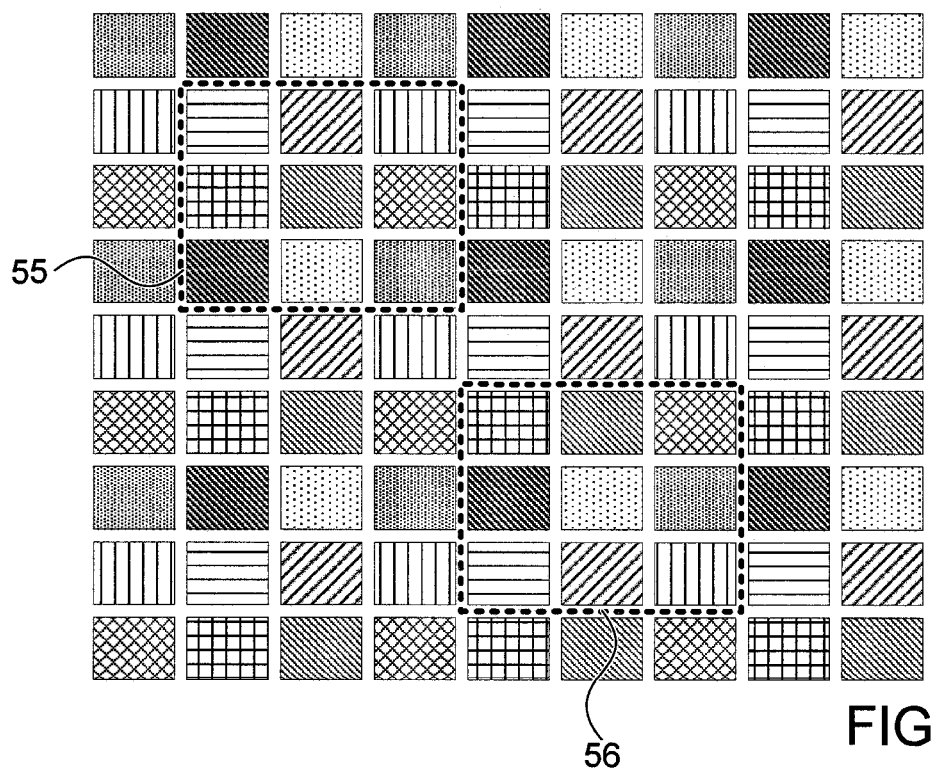
FIG. 5B illustrates the pixel structure of a novel readout CMOS array, enabling a small region of interest to be read out at a rate significantly faster than that of the conventional structure shown in FIG. 5A.

The description above has outlined how a limited region of interest can be used in order to enable high bit rate communication to the achieved with the comparatively slow frame rate of video cameras. FIG. 4 and FIGS. 5A and 5B now illustrate how this is performed in practice on a CMOS detector array.

Reference is first made to FIG. 4 which illustrates the structure commonly used in such an array, showing the signal readout lines used in order to read the contents of the pixels over the whole of the array. Each of the photosensors 40 of each pixel 41 of the array generates a charge dependent on the illumination falling thereon, and this charge is accumulated in the pixel capacitor and the voltage on the capacitor is amplified by the pixel amplifier and can be read out only when the pixel switch is closed. The pixels are arranged in rows 42 and in columns 43, with each of the pixels discharging its signal into its associated column signal wire 45 only when the pixel switch is closed. The signals from each column signal wire 45 are connected to the row signal wire 46 only when the column select switch associated with that column is closed. Thus, the array is read sequentially, with each of the pixels in one column being read sequentially, one after the other, before the pixels in the next column are read, one after the other. The serial signal output is taken from the row signal wire, 46. Alternative wiring schemes enable columns to be read out in parallel, but it is clear that in order to read a small region of interest in the array, it is necessary to read out several pixels in each column, even though the columns may be read in parallel. It is thus clear that the frame rate is limited by the time taken to read all of the relevant pixels in each column, whether or not they contain useful communication information, even if the columns are read in parallel. This procedure is thus unacceptable for increasing the bit-rates to levels required for optical communication systems.

Reference is now made to FIG. 5A, which illustrates this conventional reading process schematically. All of the pixels in column 51 are read serially, and all of the pixels in column 52 are read serially, and likewise for columns 53 and so on. Therefore, even if all of the columns 51, 52, 53 . . . Are read in parallel, even if the array gating is arranged such that only pixels with charge are read, the time for the read process for the entire array is limited.

Reference is now made to FIG. 5B, which illustrates the reading process schematically for an imaging array according to the novel structure described in this disclosure, in a similar manner to that shown in FIG. 5A. In FIG. 5B, two exemplary ROI's 55, 56, containing 9 pixels are shown. The pixels of the array are wired, such as by means of an FPGA, such that each pixel in a 9-pixel sub-region is connected to a separate "column" (which will now be called a sampling or a reading line, since it is not a true column) and every pixel within any sub-region thus has all of its immediate neighbors connected to a different sampling line. Thus, in the ROI 55, when all of the sampling lines are read in parallel, all of the pixels within the ROI are read in parallel. The array gate switching is programmed such that there is no need to read any of the other pixels from the remainder of the array outside of the known ROI, which all feed into that same sampling line. The same procedure applies wherever the ROI is situated, such as ROI 56, where there is a different arrangement of "colored" pixels in the ROI from that of ROI 55, but all of the pixels are connected to the nine different sampling lines, which are read simultaneously. Thus, in the time required to read a complete frame, all of the pixels in the ROI are read, without any time being expended on serially reading other pixels having no relation to that ROI. On the other hand, if a region of interest were to be read out using the conventionally wired array of FIG. 5A, for the 9-pixel example used, it would be necessary to read three pixels from each column serially in order to cover the ROI, and this would thus be slower than the frame rate possible in the wiring configuration of FIG. 5B. In practice, each sub-region may contain significantly more than 9 pixels, such that the frame rate can be increased accordingly. In any event, any such solution also requires careful design of the switching parameters, to ensure maximum possible switching speed. Further increase in frame rate can also be achieved by use of more complex detector structures, but this solution requires novel semiconductor structures, which may be complex and costly.

A method of further increasing the communication speed is by use of analog transmission with coded intensity levels, such that the grey levels of the detected signals at the pixels providing another dimension for the transmitted information. At every frame the camera will sample the optical signal, and will define the digital word according to the grey levels detected. By this means it is possible to use the grey level to increase the bit-rate. However this solution has limited effectiveness, firstly because of changes in intensity due to atmospheric and other changes, requiring some form of calibration signal to be transmitted to standardize the transmission level. Furthermore, due to quantum noise and dark noise level of the signal, only approximately 16 grey levels can be analogically transmitted, this being equivalent to 4 bits, such that the improvement achieved by use of analog grey levels is limited. However, lower noise detectors may enable this method to provide an additional means of increasing the information content of the transmitted signals.

Figure 6:
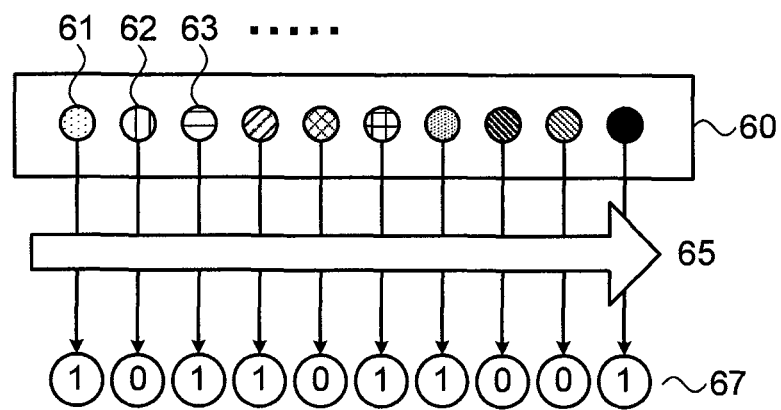
FIG. 6 illustrates schematically another method using a specific region of interest on the detector array, by which the frame rate of the detector camera array may be increased, using a laterally spread spot scheme.

Reference is now made to FIG. 6, which illustrates schematically another method using a specific region of interest on the detector array, by which the frame rate of the detector camera array may be increased, by use of spot scanning across multiple pixels of the array. Since a high frame rate is the most significant factor in achieving a high bit rate for the optical communication system, any solution which enables the transmission of more than one bit per frame could significantly simplify and improve the system. According to the method shown in FIG. 6, this can be achieved by temporally spreading the detected spot spatially across the detector array, such that the spot impinges on successive different pixels at different times. If this process is performed during the duration of a single frame, and the spot spreading is performed in a time frame quicker than the frame rate, a significant increase in information transfer rate can be achieved. Reading a strip of spots within a frame, each of the spots carrying successive bits of the optical information, is faster than reading that information from successive frames, by a factor related to the number of spots that are spread onto the single frame. By this method, 10 or 20 or even more bits of information, all read in parallel, can be extracted from a single frame. In FIG. 6, there is shown a strip 60 of the detector array with a series of successive pixels 61, 62, 63 . . . of the strip 60 of the array, on each of which the received transmission spot is successively impinged at successive times within the frame exposure time, as indicated by the arrow 65 beneath the strip. These successive spots are generated by taking the received transmission signal and spreading it laterally out along the pixels 61, 62, 63 . . . at a scanning speed selected such that each successive bit of the transmitted signal falls on a successive pixel of the strip-shaped region of interest. Each bit can then be read out by the pixel on which it has impinged, as shown by the examples of binary information at the bottom of the drawing. Since the spreading or scanning speed is such that all of the bits are detected by the successive pixels within a single frame, this method enables the bit rate per frame to be increased by a factor equal to the number of spots spread out along the pixels of the strip ROI.

Figure 7:
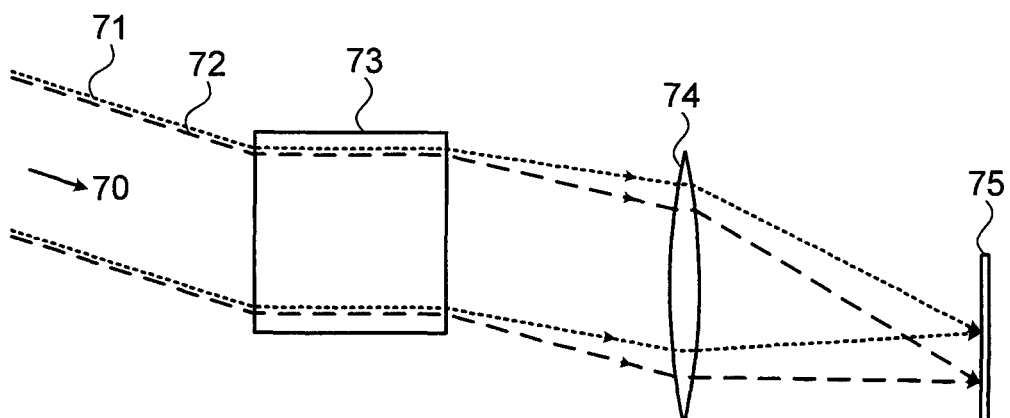
FIG. 7 illustrates schematically how the spot scanning system of FIG. 6 can be implemented in practice in the optical communication systems of this disclosure.

Reference is now made to FIG. 7, which illustrates schematically how the spot scanning system of FIG. 6 can be physically incorporated into the receiver camera of the optical communication system of this disclosure. The incoming beam 70 of the optical transmission is made up of a number of sequential information bits, shown schematically in FIG. 7 as separate dashed and dotted lines 71 and 72. In practice, these lines are co-linear and their separation is temporal, but they are drawn slightly separated for illustrative purposes only. The incoming transmission is passed through a deflection optics module 73, where it is temporally scanned out, and is focused by the lens 74 onto the image sensor array 75. The deflection optics module 73 must be capable of scanning the successive spots along the length of the frame line within a time compatible with the bit rate of the optical transmission, and also, of course, within the frame rate of the display. As an example, a reasonable number of spots in a scanned frame line could be 50-100, meaning that within a single frame 50-100 bits can be read. Since each spot may take up more than one pixel, the scanned frame line should typically include 250-500 pixels. For a 5 Mb/sec transmission rate, the typical 50-100 bits per frame figure means that the required frame rate is 50-100 kiloframes/sec. Such a frame rate cannot be realized by mechanical deflector, such as a mirror scan, and a non-mechanical optical scanner must be used, such as an acousto-optical scanner crystal. Such a scanner crystal acts as a grating which diffracts the optical beam passing through it, and by exciting the acousto-optical scanner at a variable audio frequency, the diffracted beam can be scanned with change in the exciting frequency. The deflection rate should be equal to the communication rate. However, because of the comparatively low velocity of the acoustic wave through the crystal, the transit time can only be made can comparable with the communication rate if the effective size of the acousto-optic crystal is of the order of 1 mm. A crystal of this size is difficult to use in such an optical setup, and though methods are available for increasing the crystal size, the optical complexity and cost is such that this solution may not be economical to implement using hardware currently available.

Figure 8:
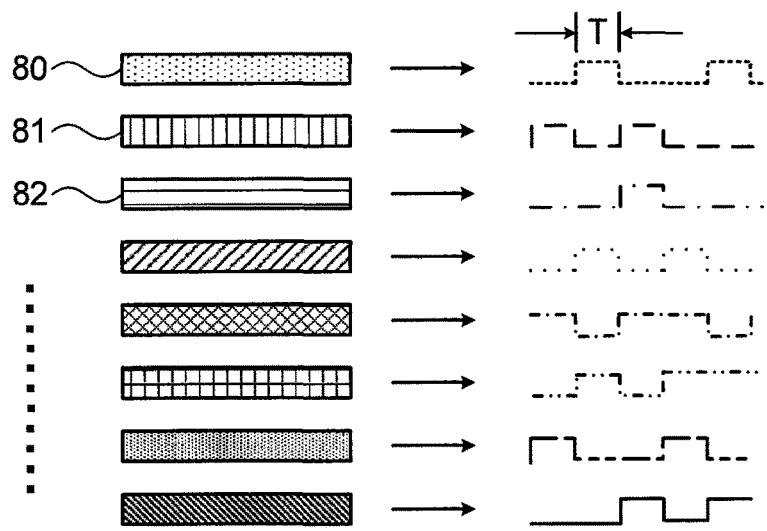
FIGS. 8-10 illustrate yet a further method by which a scanned spot configuration can be used for increasing the amount of information which can be received per frame, using multi-spectral transmission.
Figure 9:
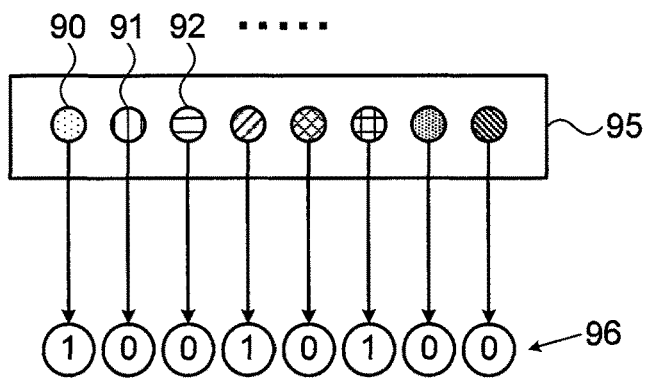
Figure 10:
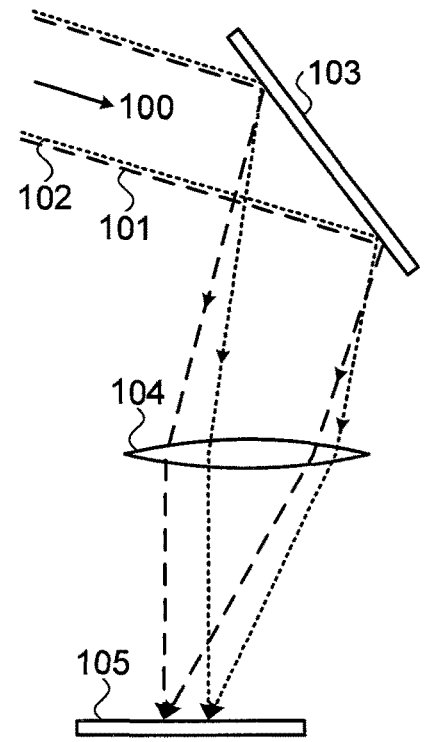

Reference is now made to FIGS. 8-10, which illustrate yet a further method by which a scanned spot configuration can be used for increasing the amount of information which can be received per frame. This method uses multispectral simultaneous signal transmissions, with a dispersive element such as a diffraction grating in order to spread the separate spectral transmissions onto successive pixels. The transmitter incorporates several laser diodes, each having its own specific preselected wavelength. The spectral spacing of the laser diodes should be such as to try to generate equal spacing of the dispersed spots on the detector array, such that spots from each successive laser fall on successive pixels of the array. Each laser diode is modulated with a digital signal, and can be encoded with different data streams. The larger the number of laser diodes used, the greater the possible increase in communication rate, since each laser diode transmits a separate wavelength channel.

Reference is now made to FIG. 8, which illustrates such an array of diode lasers, 80, 81, 82, . . . , each having a different emitted wavelength and each modulated with a digital signal for transmission. The bit length of the data should be no longer than the temporal frame width, T. The optical signals are transmitted in parallel from the transmitter, and the transmitted signal information is composed of the binary data bits transmitted simultaneously by the separate lasers, as shown on the right hand side of the drawing. During propagation through free space in the region between the transmitter and the receiver, the separate collimated laser beams diverge somewhat and if the sources are close enough and the receiver far enough away, the separate laser beams overlap, such that at the receiver input optics, the beams have combined so that all the wavelength beams, each with its specific digital information coded on it, now comprise a single optical input beam of light, incorporating all of the information but naturally "multiplexed" during free space propagation. In general, these conditions will always be practically fulfilled, because the source lasers will all be located in close proximity within the transmitter unit.

Reference is now made to FIG. 9, which illustrates schematically how the light spots 90, 91, 92, . . . of the dispersed laser beams originating from the separate laser diodes of FIG. 8 fall on successive pixels of a strip 95 of the detector array. As is observed in FIG. 8, the wavelengths of the light, as indicated by the shading of the spots, falling on sequentially located pixels along the strip of the imaging array, correspond to the wavelengths of the light emitted by the series of the laser diodes 80, 81, 82 . . . of FIG. 8. The bits from each wavelength laser can then be read out in a single frame by the pixel on which that wavelength has impinged, as shown by the example of the output binary information 96 at the bottom of the drawing, where the binary information corresponds to the bit value of each laser train in the frame window marked at time T in FIG. 8.

Reference is now made to FIG. 10, which illustrates schematically how the dispersed spot scanning system of FIG. 8 and FIG. 9 can be physically incorporated into another exemplary receiver camera of the optical communication system of this disclosure. The incoming beam 100 of the optical transmission is made up of a number of modulated beams of separate wavelength, shown schematically in FIG. 10 as separate dashed and dotted lines 101 and 102. In practice, these signals are spatially mixed and co-linear, and their separation is by wavelength, but they are drawn slightly separated for illustrative purposes only. The incoming transmission is passed to a diffraction grating 103, which is preferably a single order blazed reflection grating, such that the diffracted light is reflected in one direction only. Diffraction from the grating 103 disperses the different wavelengths of the received light into different directions according to their wavelength. Although the wavelengths and dispersion angles are related by a cosine function, and although the wavelengths of the different lasers may not be appropriately spaced, optical design can be used, so that the dispersed spots fall linearly along the pixels in the region of interest of the detector array. The dispersed light is focused by the lens 104 onto the image sensor array 105.

Figure 11:
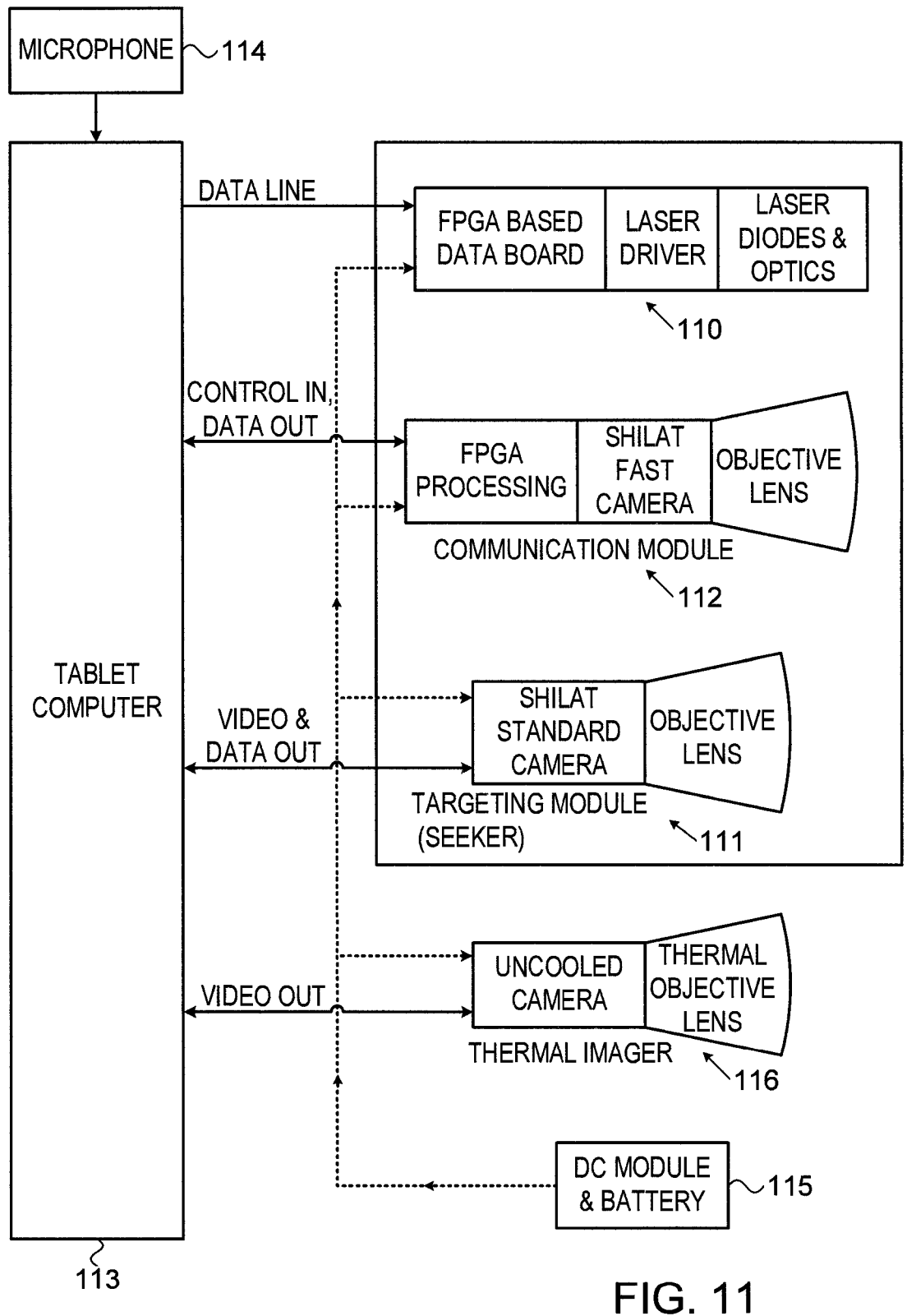
FIG. 11 is a block diagram of an exemplary transceiver, structured for implementation of the optical communication systems of the present disclosure.

Reference is now made to FIG. 11, which is a block diagram of an exemplary transceiver, structured for implementation of the optical communication systems and methods described in this disclosure. The complete communication system involves use of two functions:

(i) the auto-detection of the points between which the optical communication is to be conducted, which may be achieved using a coded laser and detection scheme, such as that described in the above mentioned International Patent Application published as WO 2011/073980; and (ii) the implementation of the optical communication itself between a pair of distant transceivers.

Each of these functions requires different optical modules, and therefore the transceiver shown in FIG. 11 comprises two laser modules and two camera modules, one set for each of the above two functions. The two laser modules should be (i) a marking laser module that transmits encoded signals for designating the target point, such as that described in WO 2011/073980, and (ii) a communication laser module that transmits digital signals for the communication link. Since the laser modules have a comparatively limited field of view, the two laser modules should be bore-sighted, and are shown in FIG. 11 in one unit 110.

The two camera modules should be:

(i) a targeting camera module 111 for seeking and automatic detection of the marker laser signal, and (ii) a communication camera module 112 utilizing a selective region of interest in its detector array, as described hereinabove by the various implementations of the present application. The communication camera may be software bore-sighted with the targeting camera. Mechanical bore-sighting is not mandated because of the wide field of view of this camera.

The transceiver also comprises a control unit 113, which could conveniently be a tablet computer, for connecting and controlling all the various modules and functions. In use, the targeting camera transfers the marking signal location when detected, to the control unit. The control unit analyses the pixel coordinates of the signal location and defines the relevant region-of-interest of the detector array of the communication camera, including pixels defining the position of the imaged transmission source on the array. The communication camera then scans for communication detected on pixels in the relevant region of interest, and can thus detect the communication laser of the remote transceiver trying to communicate with this transceiver. The communication camera can then convert the optical signal to a digital UART communication signal, and can transfer it to the control unit for display or for sound output. The controller signal processing program is also adapted to follow motion of the imaged position of the transmission source on the array, and to move the region of interest should the position of the transmission source image shift. In addition to the above described communications related elements, additional modules may also be incorporated into the transceiver of FIG. 11, such as the microphone 114 for inputting speech for transmission by the transceiver, the power supply 115, and an optional thermal imaging camera 116, for use when operating in the dark.

Figure 12:
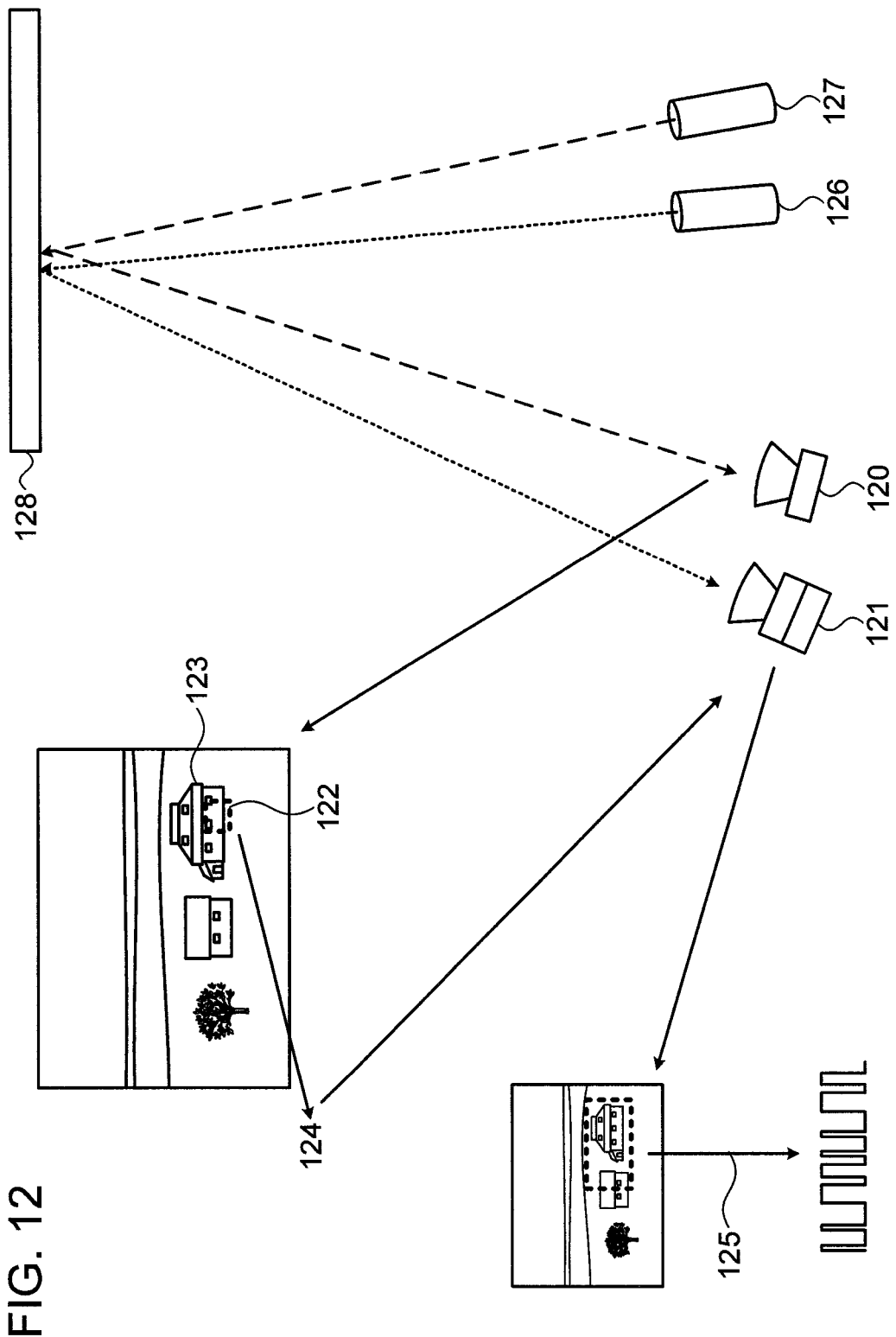
FIG. 12 shows how the optical communication systems of the present disclosure operate in the field, and may be used for line-of-sight and for non-line-of-sight communications.

Reference is now made to FIG. 12, which shows the various steps of how the optical communication systems of the present disclosure operate in the field, and how they can be used for line-of-sight (LOS) communication and for non-line-of-sight (NLOS) communication. In the scenario of FIG. 12, there is shown a local transceiver in the field, including its targeting module 120 and communication module 121. For the LOS communication mode, the local transceiver attempts to establish communications with another transceiver located in the region of the remote houses 123. When the targeting module of the transceiver detects an encoded laser designating signal from the region of the house, a region of interest of predetermined size 122, around the location of that source, is marked on the pixel map of the imaging array, and the communication module is directed to look 124 for communication signals within that region of interest. When such communication signals are detected, they can be converted to UART communication signals 125, and communication with the remote transceiver is established.

In a situation where direct line of sight communication is not possible, such as when the remote transceiver is behind an obstruction, if a common feature is visible to both the remote transceiver and the current transceiver, then communications may be established by reflecting the optical laser link off that common feature. In the scenario shown in FIG. 12, the remote transceiver is designated only by its marker laser 126 and communication laser 127, and the commonly visible feature of both the remote transceiver and the current transceiver is shown as a wall 128, visible to both. The remote transceiver 126, 127, then directs its laser beams at the wall 128, and the local transceiver 120, 121, can then communicate with the remote transceiver by means of the laser light reflected from that wall. By this means NLOS communication can also be established.

There are different requirements of the lasers for the cases of LOS and NLOS communication. For NLOS communication, because the reflected light from the commonly visible obstacle may be quite diffuse, a higher power and more collimated laser source is required. For the LOS communication situation, where there is generally ample laser power detection and communication, and eye safety too may be a factor in determining the transmitted laser power level, a lower power, and possibly diffused laser source may be used. Consequently, for communication systems of the present disclosure, which are intended to work both in LOS and NLOS situations, four lasers may be required, one pair for LOS and one pair for NLOS communication, instead of the single pair of lasers for the system described in FIG. 11.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

What is claimed is:

1. A method of optical communication between first and a second transceivers, said method comprising:

directing from said first transceiver an optically encoded marker laser signal in a general direction of said second transceiver with which it is intended to communicate;

in a targeting camera having a wide field of view, disposed in said first transceiver and directed towards said second transceiver, detecting reflections of said optically encoded marker laser received from the general direction of said second transceiver;

using a communication camera having a wide field of view, disposed in said first transceiver, said communication camera having a two-dimensional pixelated detector array to image a region including a position of said second transceiver as determined from said reflections detected by said targeting camera, on said two-dimensional pixelated detector array, successive frames of said array being readable at a first frame reading rate;

detecting on said array the position of said imaged second transceiver;

selecting a region of interest on said array, including said position of said imaged second transceiver, said region of interest having a substantially smaller number of pixels than said pixelated detector array; and receiving on said array, signals transmitted by a communication laser in said second transceiver, and reading signals only from pixels in said region of interest, at a frame rate faster than said first frame rate.

2. A method according to claim 1, further comprising provision of array gate switching, programmed such that signals from pixels of said array outside of said selected region of interest are not read.

3. A method according to claim 1, wherein said region of interest is moved to track motion of said position of said imaged second transceiver on said array.

4. A method according to claim 1, wherein the signal outputs of each of the pixels within sub-regions of said pixelated detector array, having a predefined area, are wired in separate read lines, such that each of the pixels of a sub-region can be read simultaneously on separate read lines.

5. A method according to claim 4, wherein pixels from corresponding positions in different sub-regions of said array are all wired to the same read lines, such that all of the pixels of a region of interest can be read simultaneously, independently of where that region of interest falls on said array.

6. A method according to claim 4, wherein every pixel within any sub-region has all of its immediate neighbors connected to a different sampling line.

7. A method according to claim 4, wherein said regions of interest are selected to be no larger than said sub-regions of predefined area.

8. A method according to claim 4, wherein said regions of interest are selected such that all of their pixels fall within the size and shape of said sub-regions of predefined area.

9. A system for optical communication, comprising:
a first transceiver incorporating an optically encoded marker laser, such that it can emit signals in a general direction of a second transceiver with which it is intended to communicate;
a targeting camera having a wide field of view, disposed in said first transceiver and adapted to be directed towards said second transceiver, such that it detects reflections of said optically encoded marker laser received from the general direction of said second transceiver;
a communication camera having a wide field of view, disposed in said first transceiver, said communication camera comprising a two-dimensional pixelated detector array, such that an image of a region including a position of said second transceiver, as determined from said reflections detected by said targeting camera, can be obtained on said array; and
a controller adapted to select a region of interest including pixels defining the position of said imaged second transceiver on said array, said region of interest having a substantially smaller number of pixels than said two-dimensional pixelated detector array,
wherein signals from pixels only in said region of interest can be read at a frame rate faster than the frame rate of a complete frame of said array.

10. A system according to claim 9, further comprising a field programmable gate array, programmed such that signals from pixels of said array outside of said selected region of interest are not read.

11. A system according to claim 9, wherein said controller is adapted to track motion of said position of said imaged second transceiver on said array, and to shift said region of interest to include pixels defining the new position of said imaged second transceiver.

12. A system according to claim 10, wherein said pixelated detector array is wired, using said a field programmable gate array, such that signal outputs of each of the pixels within sub-regions having a predefined area of said pixelated detector array, are directed to separate read lines, such that each of the pixels of a sub-region can be read simultaneously on said separate read lines.

13. A system according to claim 12, wherein pixels from corresponding positions in different sub-regions of said array are all wired to the same read lines, such that all of the pixels of a region of interest can be read simultaneously, independently of where that region of interest falls on said array.

14. A system according to claim 12, wherein every pixel within any sub-region has all of its immediate neighbors connected to a different sampling line.

15. A system according to claim 12, wherein said regions of interest are selected to be no larger than said sub-regions of predefined area.

16. A system according to claim 12, wherein said regions of interest are selected such that all of their pixels fall within the size and shape of said sub-regions having a predefined area.

\* \* \* \* \*